Patented Aug. 28, 1928.

1,682,589

UNITED STATES PATENT OFFICE.

JOSEPH HAY AMIES, OF PHILADELPHIA, PENNSYLVANIA.

SEMILIQUID BITUMINOUS COMPOSITION.

No Drawing. Application filed February 20, 1923. Serial No. 620,305.

The present invention relates to a semi-liquid bituminous composition calculated for use as a paint or similar covering material.

The invention consists of the combination of ingredients hereinafter described and finally claimed for forming a semi-liquid bituminous composition.

In the practice of the invention, use is made of solidified bituminous materials, crude petroleum oil, crude naphtha and unslaked lime. The crude naphtha, after the employment of the slaking lime, is mixed therewith and made thoroughly integral with the body of the paint. The solidified bituminous material I reduce to a granular condition as by rolling or grinding. To the granular bituminous material I add and mix therewith crude petroleum oil, and crude naphtha and mix the same together. The bituminous pitchy material will consist of what in the trade is called hard asphaltum or coal tar pitch. The hard asphaltum may come from the natural deposits of asphaltum in strata to be found in Venezuela, Trinidad, California and other locations, or it may consist of hard residuum asphaltum secured from the process of extracting oils and gasolene from crude petroleum oil. Bituminous pitchy materials, however, may include what is known as ship pitch. This is a residuum from turpentine distillation. Applicant, however, has in mind the employment of the previous materials above stated. The mixing of these ingredients is secured in a heating still, sufficient heat being applied to cause an intimate association of the bituminous material and crude petroleum oil. For the purpose I employ about 65 pounds of granular bituminous material and about 35 pounds of crude petroleum oil. Meanwhile, I have taken about 15 pounds of unslaked lime and added thereto sufficient water in highly heated condition to cause a slaking of the lime. While the lime is in a slaking condition I add it to and stir it in with the heated bituminous material and crude petroleum oil in the heated still. In another vessel which should be as air tight as practical I place about 10 pounds of crude naphtha. The heated bituminous material and crude petroleum oil with which has been mixed the slaking lime is now poured in air tight vessels and stirred or mixed with the crude naphtha to obtain an intimate association of all the ingredients contained in the vessels. The vessels are then immediately closed and as before mentioned should be as air tight as practical. The slaking lime will, if only a small portion of heated water has been employed, fix the volatile and essential oil of the crude petroleum, crude naphtha and bituminous material. The crude naphtha and crude petroleum oil are thus fixed within the integral structure of the bituminous material.

The above described semi-liquid bituminous composition may be used as a paint upon wood and iron. It has the tendency to prevent the rotting of wood and to prevent the oxidation of iron. When used as a paint it provides an enameled or glossy surface; is water, air and acid proof; and is indifferent to changes in temperature. However, the composition may be used for purposes other than painting, namely, coating various objects. It may, if desired, be mixed with mineral or organic materials in the forming of mortars and concretes.

The above described composition may, if desired, be utilized immediately after manufacture. In this event the crude naphtha is placed in the heating-still along with the bituminous material, crude petroleum oil and slaking lime, and after an intimate association is obtained the composition may be immediately used.

If at the time of its employment the composition is too dry and stiff for application it may be reduced to desired consistency by the addition of more crude naphtha. If the composition should not be sufficiently tough and dry at the time of its employment additional lime, in a slaking condition, may be added thereto. About 5 pounds of additional slaking lime to each 100 pounds of composition will effect the result desired. Thus, any desired degree of toughness and dryness may be effected and by continuing the heating of the composition within a still for a sufficient length of time the toughness and dryness is enhanced.

Having thus described my invention what I claim is:

The herein described method of making a semi-liquid bituminous composition which consists in placing approximately sixty-five pounds of granulated bituminous material in a heating still, then placing therewith about thirty-five pounds of crude petroleum oil, or the like, and mixing the two together through the medium of heat, until thoroughly united, then adding thereto and therewith, substantially fifteen pounds of granulated oxide of calcium in an already slaking condition, then adding ten pounds of crude naphtha therewith after the employment of the slaking of the lime, and then causing the same to become thoroughly integral with the body of the composition substantially as specified.

In testimony whereof I have hereunto signed my name.

JOSEPH HAY AMIES.